(12) United States Patent
Xin et al.

(10) Patent No.: US 12,206,171 B2
(45) Date of Patent: Jan. 21, 2025

(54) AUTOMOBILE RADARS BASED ON GRADIENT-INDEX LENS

(71) Applicant: Lunewave Inc., Tucson, AZ (US)

(72) Inventors: Hao Xin, Tucson, AZ (US); Jiang Xin, Wellesley, MA (US); Min Liang, Tucson, AZ (US); Ning Cao, Tucson, AZ (US)

(73) Assignee: Lunewave Inc., Tucson, AZ (US)

( * ) Notice: Subject to any disclaimer, the term of this patent is extended or adjusted under 35 U.S.C. 154(b) by 233 days.

(21) Appl. No.: 17/908,404

(22) PCT Filed: Nov. 25, 2020

(86) PCT No.: PCT/US2020/062313
§ 371 (c)(1),
(2) Date: Aug. 31, 2022

(87) PCT Pub. No.: WO2021/108621
PCT Pub. Date: Jun. 3, 2021

(65) Prior Publication Data
US 2023/0091904 A1 Mar. 23, 2023

Related U.S. Application Data

(60) Provisional application No. 62/940,010, filed on Nov. 25, 2019.

(51) Int. Cl.
*H01Q 19/06* (2006.01)
*G01S 7/02* (2006.01)
(Continued)

(52) U.S. Cl.
CPC .......... *H01Q 19/062* (2013.01); *G01S 7/027* (2021.05); *G01S 13/42* (2013.01); *G01S 13/931* (2013.01); *H01Q 21/0037* (2013.01)

(58) Field of Classification Search
CPC ............. H01Q 19/062; H01Q 21/0037; H01Q 1/3233; H01Q 19/06; H01Q 21/0043;
(Continued)

(56) References Cited

U.S. PATENT DOCUMENTS 6,335,700 B1 * 1/2002 Ashihara ............... G01S 7/4004
342/117
9,799,949 B2 * 10/2017 Kamo ............... B32B 17/10036
(Continued)

FOREIGN PATENT DOCUMENTS

WO    WO-2018035148 A1 * 2/2018 ............. B33Y 80/00
WO       2021108621 A1    6/2021

*Primary Examiner* — Daniel D Chang
(74) *Attorney, Agent, or Firm* — Mintz, Levin, Cohn, Ferris, Glovsky and Popeo, P.C.

(57) ABSTRACT

A sensing system is provided that includes a first sub-sensing system having a first azimuth plane. The first sub-sensing system includes a Gradient-index lens, and a first plurality of antenna elements arranged adjacent to the Gradient-index lens and configured to receive a first signal emanating from a first field of view. The sensing system also includes a second sub-sensing system having a second azimuth plane oriented at an angle with respect to the first azimuth plane and a second plurality of antenna elements configured to receive a second signal emanating from a second field of view.

20 Claims, 13 Drawing Sheets

(51) Int. Cl.
  *G01S 13/42*      (2006.01)
  *G01S 13/931*     (2020.01)
  *H01Q 21/00*      (2006.01)

(58) Field of Classification Search
  CPC ......... H01Q 15/08; G01S 7/027; G01S 13/42;
       G01S 13/931; G01S 7/028; G01S 13/582;
       G01S 13/878; G01S 13/89; B60W 40/02;
                                 B60W 2420/403
  See application file for complete search history.

(56)         References Cited

U.S. PATENT DOCUMENTS

| | | |
|---|---|---|
| 2003/0006941 A1 | 1/2003 | Ebling et al. |
| 2014/0139370 A1 | 5/2014 | Hamner et al. |
| 2016/0227193 A1* | 8/2016 | Osterwood ............. G01S 17/42 |
| 2018/0210075 A1 | 7/2018 | Kim et al. |

\* cited by examiner

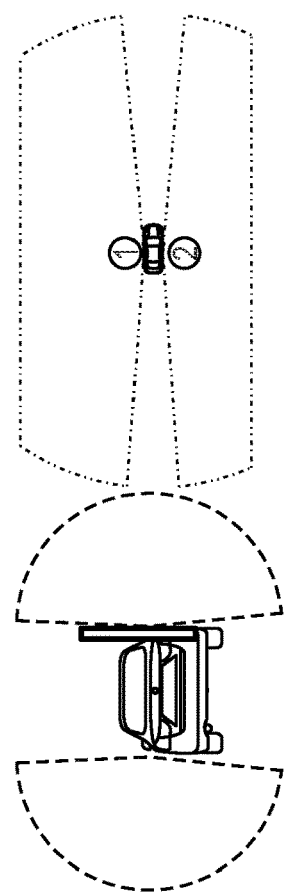
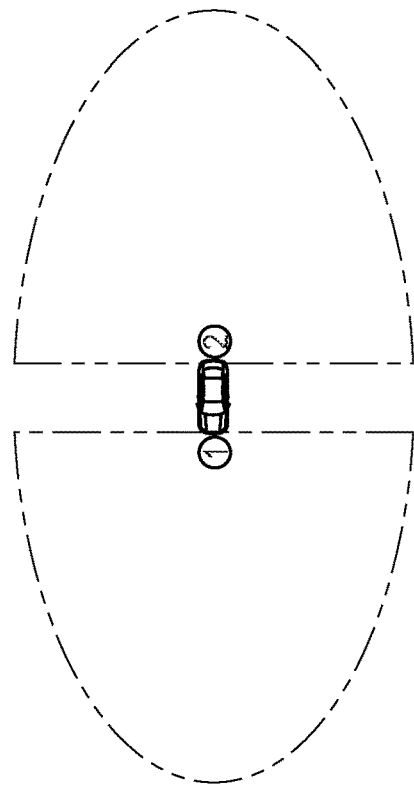
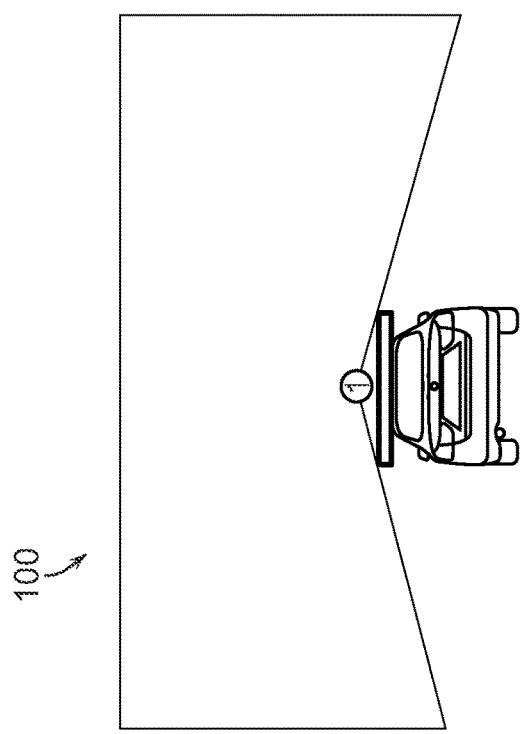
FIG. 1B
FIG. 1C
FIG. 1A

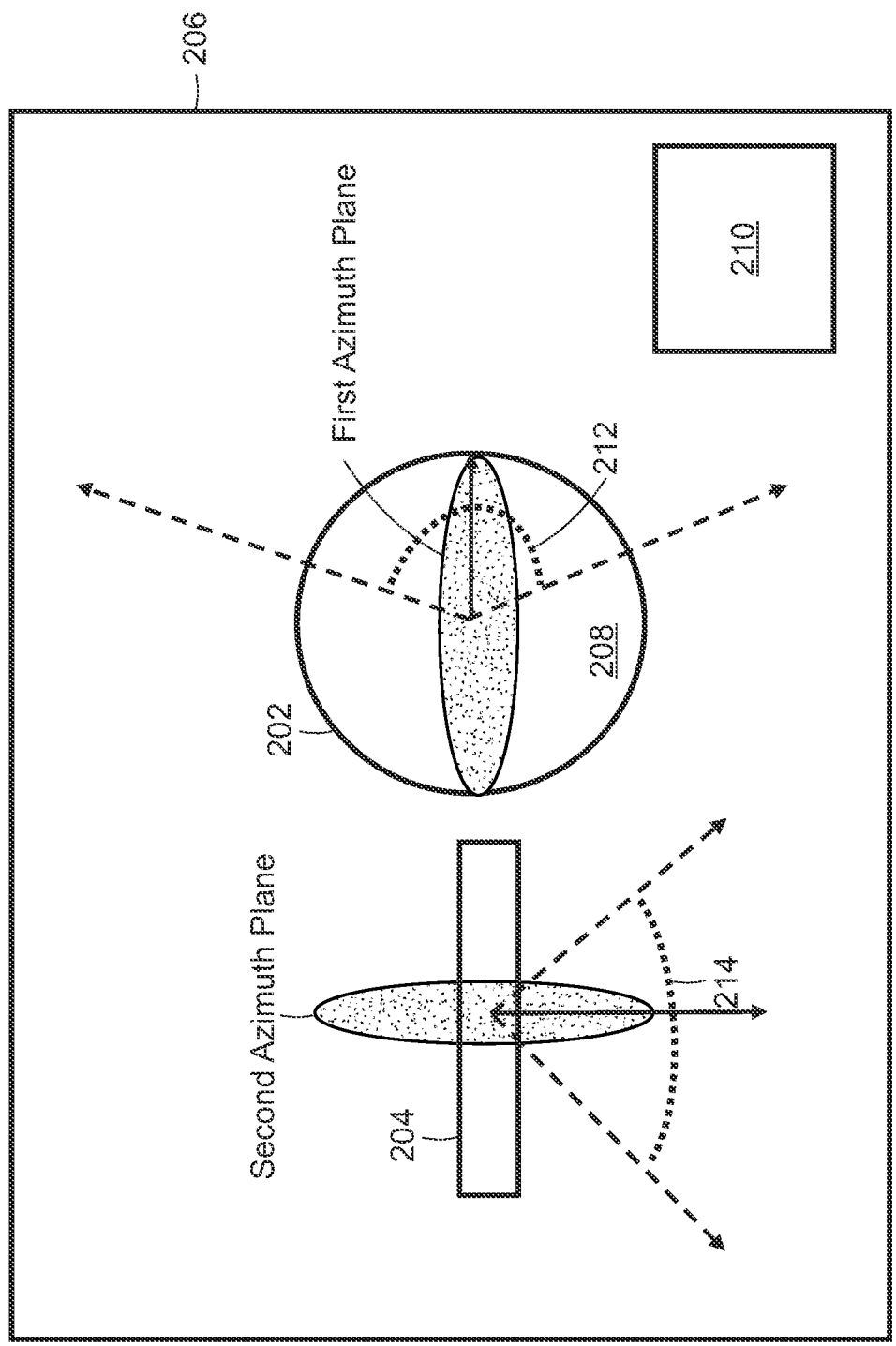

AUTOMOBILE RADARS BASED ON GRADIENT-INDEX LENS

CROSS-REFERENCE TO RELATED APPLICATION

This application is a National Stage Application, filed under 35 U.S.C. § 371, of International Application No. PCT/US2020/062313, filed on Nov. 25, 2020, which claims the benefit and priority to U.S. Provisional Patent Application No. 62/940,010 filed on Nov. 25, 2019, the disclosures of all of which are incorporated herein by reference in their entirety.

TECHNICAL FIELD

The present disclosure relates generally to a sensing system, and more particularly, to a gradient index lens based reconfigurable sensing system.

BACKGROUND

Gradient index (GRIN) components are electromagnetic structures that can exhibit spatially-continuous variations in their index of refraction n. The Luneburg lens is an attractive gradient index device for multiple beam tracking because of its high gain, broadband behavior, and ability to form multiple beams. Every point on the surface of a Luneburg lens is the focal point of a plane wave incidents from the opposite side. The permittivity distribution of a Luneburg Lens is given by:

$$\varepsilon_r = 2 - \left(\frac{r}{R}\right)^2$$

where $\varepsilon_r$ is the permittivity, R is the radius of the lens and r is the distance from the location to the center of the lens.

SUMMARY

According to one aspect, the present disclosure provides a system that includes a first sub-sensing having a first azimuth plane. The first sub-sensing system includes a Gradient-index lens and a first plurality of antenna elements that are arranged adjacent to the Gradient-index lens and are configured to receive a first signal emanating from a first field of view. The sensing system further includes a second sub-sensing system having a second azimuth plane oriented at an angle with respect to the first azimuth plane and a second plurality of antenna elements configured to receive a second signal emanating from a second field of view.

In addition, a combination of the first field of view and the second field of view has a vertical field of view greater than about 90 degrees. The sensing system may further include a cover that encloses the first and second sub-sensing systems and the cover also couples the first sub-sensing system and the second sub-sensing system to a vehicle. The angle with respect to the first azimuth plane and a second plurality of antenna elements is about 90 degrees.

In an exemplary embodiment, the sensing system includes a controller that is configured to receive a first plurality of antenna signals from the first plurality of antenna elements and a second plurality of antenna signal from the second plurality of antenna elements. The controller is configured to determine a direction of a target objected associated with the first signal or the second signal based on the first plurality of antenna signals and the second plurality of antenna signals. The first signal and the second signal include a reflection, by the target object, of a portion of an outgoing signal generated by a transmitter of the sensing system.

According to another aspect, the present disclosure provides a sensing system that includes a receiver having a Gradient-index lens and a first plurality of antenna elements that are arranged adjacent to the Gradient-index lens and are configured to receive a first incoming signal and generate a plurality of receiver signals in response to receiving the first incoming signal. The first incoming signal includes a portion of the outgoing signal reflected by a target object. The system further includes a transmitter having a second plurality of antenna elements configured to generate an outgoing signal. Each of the second plurality of antenna elements are separated by a predetermined distance. Additionally, the system includes a controller configured to receive the plurality of receiver signals from the first plurality of antenna elements, and generate a plurality of transmitter signals based on which the transmitter generates the outgoing signal.

In one exemplary embodiment, the system further includes plurality of transmission lines configured to transmit the plurality of receiver signals from the first plurality of antenna elements to the controller and transmit the plurality of transmitter signals from the controller to the transmitter. The controller is included in a radar chip and includes at least one receiver circuit and at least one transmitter circuit.

Further, the sensing system includes a first switch configured to electrically connect the at least one receiver circuit to a first antenna element of the first plurality of antenna elements during a first time period, and to a second antenna element of the first plurality of antenna elements during a second time period. The first time period is temporally separated from the second time period. Additionally, a second switch is configured to electrically connect the at least one transmitter circuit to a third antenna element of the second plurality of antenna elements during a third time period, and to a fourth antenna element of the second plurality of antenna elements during a fourth time period. The third time period is temporally separated from the fourth time period.

The radar chip, the first plurality of antenna elements, the second plurality of antenna elements, and the feed element array are included in a flexible printed circuit board. A first portion of the flexible printed circuit board comprising the first plurality of antenna elements surrounds a second portion of the gradient-index lens. In addition, the receiver is located within a vehicle and the second plurality of antenna elements are located at varied locations within the vehicle separate from the receiver. A distance between the locations of the second plurality of antenna elements is proportional to an angular resolution associated with the sensing system. A portion of the outgoing signal is transmitted to the receiver via one or more of a transmission line, and an optical fiber.

According to one aspect, the sensing system can further include a plurality of waveguides configured to transmit the plurality of receiver signals from the first plurality of antenna elements to the controller. The first plurality of antenna elements include plurality of openings of the first plurality of waveguides.

According to yet another aspect, the present disclosure provides a method including the process of transmitting, by a transmitter, a first outgoing signal during a first time period and receiving, by a receiver, a first incoming signal comprising a portion of the first outgoing signal reflected by a first target object located at a first distance from the transmitter. The first distance is greater than a threshold distance. The transmitter further transmits a second outgoing signal during a second time period and the receiver receives a second incoming signal different from the first incoming signal. The second outgoing signal is directed at the first target object. Based on the second incoming signal, the method includes determining that a second target object is located at a second distance, wherein the second distance is smaller than the threshold distance.

The method may further include calculating a differential metric indicative of a difference between amplitudes of the second incoming signal and the first incoming signal and determining, based on the differential metric, that the second target object is located at the second distance smaller than the threshold distance. The transmitter and the second target object move relative to each other between the first time period and the second time period. The receiver also includes a Gradient-index lens and a first plurality of antenna elements that are arranged adjacent to the Gradient-index lens and are configured to receive the first and the second incoming signals. The transmitter includes a second plurality of antenna elements configured to generate the first and the second outgoing signals.

According to another aspect, the present disclosure provides a sensing system that includes a plurality of transmitter antenna elements. A first transmitter antenna element of the plurality of transmitter antenna elements is configured to generate a first plurality of outgoing signals during a first time duration, and a second transmitter antenna element of the plurality of transmitter antenna elements is configured to generate a second plurality of outgoing signals during a second time duration. The sensing system also includes a receiver configured to receive a first and a second plurality of incoming signals. Each incoming signal of the first and the second plurality of incoming signals includes a portion of a unique outgoing signal of the first and the second plurality of outgoing signals, respectively. The first and the second plurality of incoming signals are reflected by a target object moving relative to the transmitter. The transmitter further includes a controller configured to receive data characterizing the first and the second plurality of incoming signals from the receiver. The controller is also configured to sample data for one or more incoming signals of the first and the second plurality of incoming signals.

The controller is further configured to generate a first transformed data by applying a range Fourier transform to the sampled data of the one or more incoming signal. The first transformed data is a function of a plurality of range values associated with the target object and duration of generation of the first and second plurality of outgoing signals. The controller is also configured to generate a second transformed data by applying a velocity Fourier transform to portions of the first transformed data associated with each range values of the plurality of range values. The second transformed data is a function of a plurality of velocity values and the plurality of range values associated with the target object. The controller is further configured to interpolate, for a given range value, data associated with the plurality of velocity values in the second transformed data, and determine, based on the interpolated data, a location of the target object. Other than interpolation, stitching the data from multiple transmitters and apply Doppler FFT to the stitched data can be also applied to obtain higher resolution and more accurate velocity of the object.

Further, the controller is configured to determine the location of the target object by applying a first doppler phase to portions of the interpolated data associated with the first plurality of incoming signals and by applying a second doppler phase to portions of the interpolated data associated with the second plurality of incoming signals. The first doppler phase is associated with relative velocity between the first transmitter and the target during the first time duration and the second doppler phase is associated with relative velocity between the second transmitter and the target during the second time duration.

According to yet another aspect, the present disclosure provides a sensing system that includes a plurality of transmitter antenna elements. A first transmitter antenna element of the plurality of transmitter antenna elements is configured to generate a first plurality of outgoing signals during a first time duration, and a second transmitter antenna element of the plurality of transmitter antenna elements is configured to generate a second plurality of outgoing signals during a first time duration. The sensing system also includes a receiver configured to receive a first and a second plurality of incoming signals. Each incoming signal of the first and the second plurality of incoming signals includes a portion of a unique outgoing signal of the first and the second plurality of outgoing signals, respectively. The first and the second plurality of incoming signals are reflected by a target object moving relative to the transmitter. The transmitter further includes a controller configured to receive data characterizing the first and the second plurality of incoming signals from the receiver. The controller is also configured to sample data for one or more incoming signals of the first and the second plurality of incoming signals. The controller is also configured to sample data for one or more incoming signals of the first and the second plurality of incoming signals. The controller is further configured to generate a first transformed data by applying a range Fourier transform to the sampled data of the one or more incoming signal.

The first transformed data is a function of a plurality of range values associated with the target object and duration of generation of the first and second plurality of outgoing signals. The controller is further configured to generate a transmitter phase compensated data by applying a first phase compensation to portions of the first transformed data associated with the first plurality of incoming signals, and by applying a second phase compensation to portions of the first transformed data associated with the second plurality of incoming signals. The controller is also configured to generate a second transformed data by applying a velocity Fourier transform to portions of the transmitted phase compensated data associated with each range values of the plurality of range values. The second transformed data is a function of a plurality of velocity values and the plurality of range values associated with the target object. The controller is further configured to generate a Doppler phase compensated data by applying a first doppler phase to portions of the second transformed data associated with the first plurality of incoming signals and by applying a second Doppler phase to portions of the second transformed data associated with the second plurality of incoming signals. The controller is also configured to determine, based on doppler phase compensated data, a location of the target object.

Further, the first doppler phase is associated with relative velocity between the first transmitter and the target during the first time duration and the second doppler phase is associated with relative velocity between the second transmitter and the target during the second time duration. In addition, the receiver includes a Gradient-index lens, and a first plurality of antenna elements arranged adjacent to the Gradient-index lens and configured to receive the first and the second incoming signals.

According to another aspect, the present disclosure provides a sensing system that includes a plurality of transmitter antenna elements configured to generate a plurality of outgoing signals. A first transmitter antenna element of the plurality of transmitter antenna elements is configured to generate a first plurality of outgoing signals during a first time duration, and a second transmitter antenna element of the plurality of transmitter antenna elements is configured to generate a second plurality of outgoing signals during a second time duration. The sensing system also includes a receiver configured to receive a plurality of incoming signals comprising a first and a second plurality of incoming signals. Each incoming signal of the first and the second plurality of incoming signals includes a portion of a unique outgoing signal of the first and the second plurality of outgoing signals, respectively. The first and the second plurality of incoming signals are reflected by a target object moving relative to the transmitter. The sensing system further includes a controller configured to receive data characterizing the first and the second plurality of incoming signals from the receiver. The controller is also configured to sample data for one or more incoming signals of the first and the second plurality of incoming signals.

The controller is further configured to generate a first transformed data by applying a range Fourier transform to the sampled data of the one or more incoming signal. The first transformed data is a function of a plurality of range values associated with the target object and duration of generation of the first and second plurality of outgoing signals. The controller is also configured to generate a second transformed data by applying a velocity Fourier transform to portions of the first transformed data associated with each range values of the plurality of range values. The second transformed data is a function of a plurality of velocity values and the plurality of range values associated with the target object.

The controller is also configured to determine, a first range value of the target object from portion of the second transformed data associated with the first transmitter antenna element and a second range value from portion of the second transformed data associated with the second transmitter antenna element. The controller is further configured to determine an ambiguity integer based on the first range value, the second range value and the duration between the first time duration and the second time duration. The controller is also configured to determine, based on the ambiguity integer, a real velocity value associated with each velocity value of the plurality of velocity values.

Further, the controller is configured to interpolate, for a given velocity value, data associated with the plurality of range values in the second transformed data, prior to determination of ambiguity integer. In addition, the receiver includes a Gradient-index lens, and a plurality of antenna elements arranged adjacent to the Gradient-index lens and configured to receive the plurality of incoming signals generated by reflection of the plurality of outgoing signals by the target object. The receiver includes the plurality of antenna elements.

According to yet another aspect, the present disclosure provides a sensing system that includes a transmitter antenna element configured to generate a plurality of outgoing signals. The sensing system also includes a receiver configured to receive a plurality of incoming signals. Each incoming signal of the plurality of incoming signals includes a portion of a unique outgoing signal of the plurality of outgoing signals. The plurality of incoming signals are reflected by a target object. The sensing system further includes a controller configured to receive data characterizing the plurality of incoming signals from the receiver, and calculate a standard deviation associated with amplitudes of the signals in the plurality of incoming signals.

Further, the controller is configured to determine that the value of the standard deviation is above a predetermined threshold, and determine that the target object is a live object. The controller is configured to determine that the value of the standard deviation is below a predetermined threshold, and determine that the target object is a non-living object.

Notably, the present invention is not limited to the combination of the radar system elements as listed above and may be assembly in any combination of the elements as described herein.

Other aspects of the invention as disclosed infra.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 1A-E illustrate exemplary fields of view of GRIN lens based sensing system mounted at various locations in automobiles;

FIG. 2A illustrates an exemplary modified sensing system for automobiles;

Figure 1E:
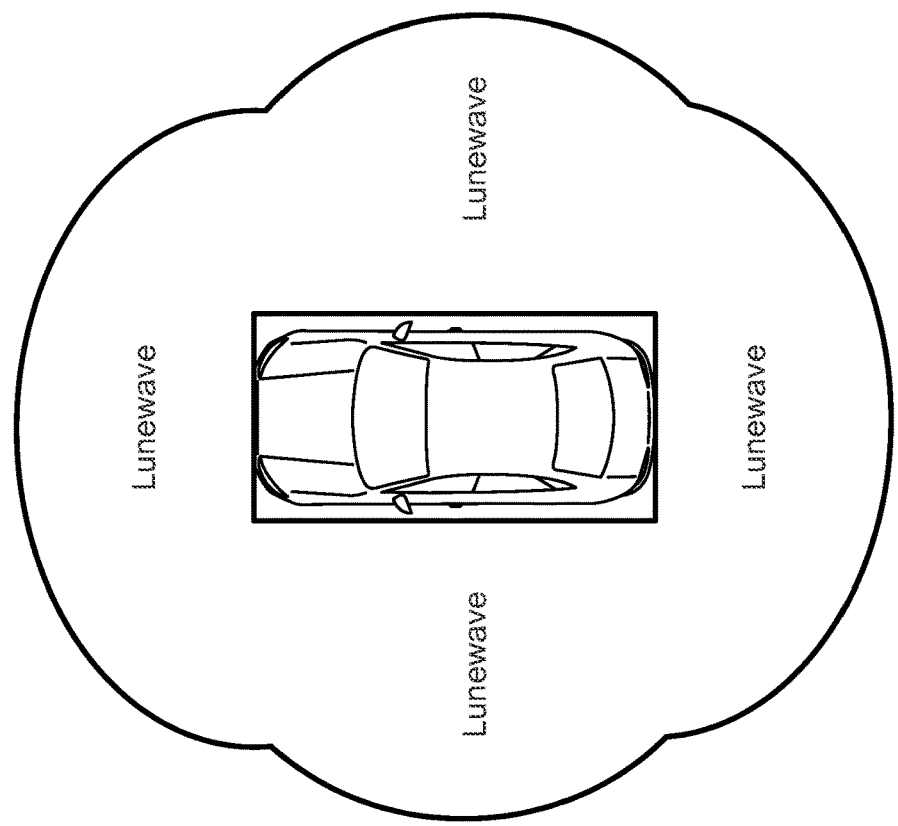

It should be understood that the appended drawings are not necessarily to scale, presenting a somewhat simplified representation of various preferred features illustrative of the basic principles of the disclosure. The specific design features of the present disclosure as described herein, including, for example, specific dimensions, orientations, locations, and shapes will be determined in part by the particular intended application and use environment.

In the figures, reference numerals refer to the same or equivalent parts of the present disclosure throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Autonomous vehicles can use sensing systems that allows them to navigate in an environment with little or no human input. These sensing systems need to be fast and efficient in detecting objects (e.g., vehicles, humans, etc.) in their vicinity of the autonomous vehicle. Additionally, it can be desirable that the sensing system have a large field of view both in the horizontal direction ("horizontal field of view") and in the vertical directions. ("vertical field of view"). Gradient index (GRIN) lens based sensing systems can have desirable horizontal field of view (e.g., in the azimuth plane). In some cases, improvement of the vertical field of view of gradient index lens based communication system may be needed. This can be achieved by modifying the GRIN lens based system to include an antenna having a different orientation than the gradient index lens antenna. This provides an improvement in the vertical field of view of the sensing system which can improve the detection of objects (e.g., close to the ground) by autonomous vehicles.

Figure 1D:
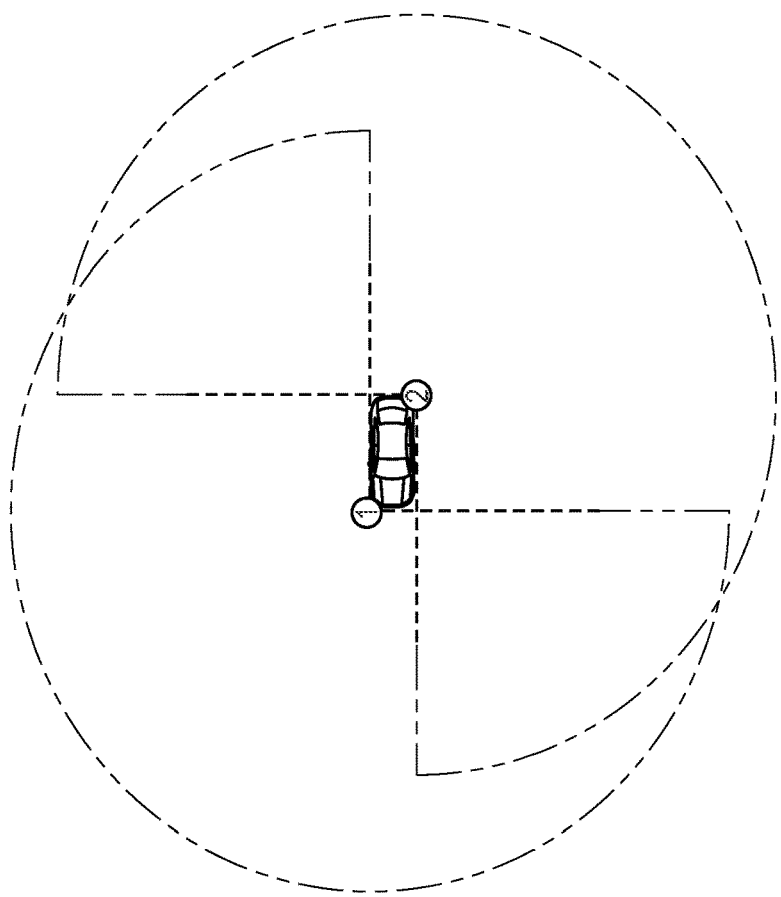

FIGS. 1A-E illustrate exemplary fields of view of GRIN lens (e.g., Luneburg lens) based sensing system mounted at various locations in an automobile. FIG. 1A illustrates a field of view GRIN lens based sensing system (henceforth referred to as "sensing system") mounted on top of a vehicle. In this implementation, the sensing system can have a horizontal field of view of 360 degrees. However, the vertical field of view can be limited by the automobile. FIG. 1B illustrates fields of view of two sensing systems mounted on an automobile. Each sensing system can detect objects in half of the azimuth plane, and together they can cover the entire azimuth plane. The vertical field of view of the sensing system can range from zero degrees to about 180 degrees. In some implementations, increasing the vertical field of view can result in an increase in the cost of the sensing system. FIG. 1C illustrates fields of view of two sensing systems mounted at the front and at the back of an automobile, respectively. FIG. 1D illustrates fields of view of two sensing systems mounted at diagonally opposite ends of an automobile with 270-degree FOV each so that the entire azimuth plane can be covered with redundancy. FIG. 1E illustrates fields of view of four sensing systems mounted at the front and back and at the two sides of an automobiles which can also covers the entire azimuth plane with redundancy.

The vertical field of view can be improved by modifying the GRIN lens sensing system to including a second antenna (e.g., planer array radar). FIG. 2A illustrates an exemplary modified sensing system 200 that includes a Luneburg based antenna 202 and a second antenna 204 enclosed in a cover 206. The first and the second azimuthal planes of antennas 202 and 204, respectively, are oriented at an angle relative to each other (e.g., 90 degrees, 80 degrees, etc.). Antenna 202 and 204 can detect an incoming signal. For example, the incoming signal can include portions of an outgoing signal (e.g., from a transmitter in the sensing system 200) reflected by an object (e.g., near an automobile).

Antenna 202 can include antenna elements (not shown) arranged on or adjacent to the Luneburg lens 208. These antenna elements can receive an incoming signal in a first field of view comprising a horizontal field of view (e.g., 360 degrees in the first azimuth plane) and a vertical field of view 212. Antenna 204 can include antenna elements (not shown) that can receive an incoming signal in a second field of view that includes a second vertical field of view 214. While each of the vertical fields of view 212 and 214 can be less than 90 degrees, the combined vertical field of view can be more than 90 degrees.

Sensing system 200 can include a controller 210 communicatively coupled to the antennas 202 and 204. The controller 210 can receive a first plurality of antenna signals from the plurality of antenna elements in the antenna 202 and a second plurality of antenna signals from the antenna elements in the antenna 204. The controller 210 can generate a combined signal that includes the first and second plurality of antenna signals that can be indicative of a combined field of view. The combined field of view can have a combined vertical field of view (e.g., of 90 degrees) and a horizontal field of view (e.g., 360 degrees). The controller 210 can transmit the combined signal (e.g. to control systems of an autonomous vehicle).

Figure 2B:
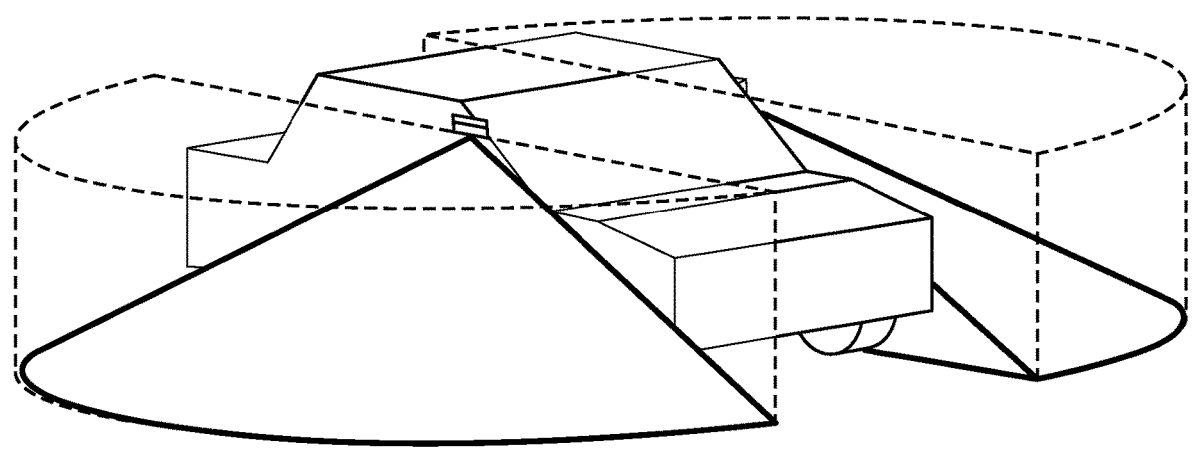
FIG. 2B illustrates an exemplary field of view of the modified sensing system in FIG. 2A.

FIG. 2B illustrates an exemplary field of view of the modified sensing system in FIG. 2A. The modified sensing system can be coupled to an automobile. The combined field of view of modified sensing system includes a first field of view of the Luneburg lens based antenna (e.g. antenna 202) illustrated in pink, and a second field of view of the second antenna (e.g., antenna 204) illustrated in blue. The combined field of view can have a horizontal field of view of 360 degrees and a vertical field of view of 90 degrees. The vertical field of view can range from a horizontal plane to a direction almost perpendicular to the horizontal plane and directed to the ground (on which the automobile is placed).

This range and orientation of the vertical field of view can allow for detection of objects that are proximal to the automobile.

Figure 3A:
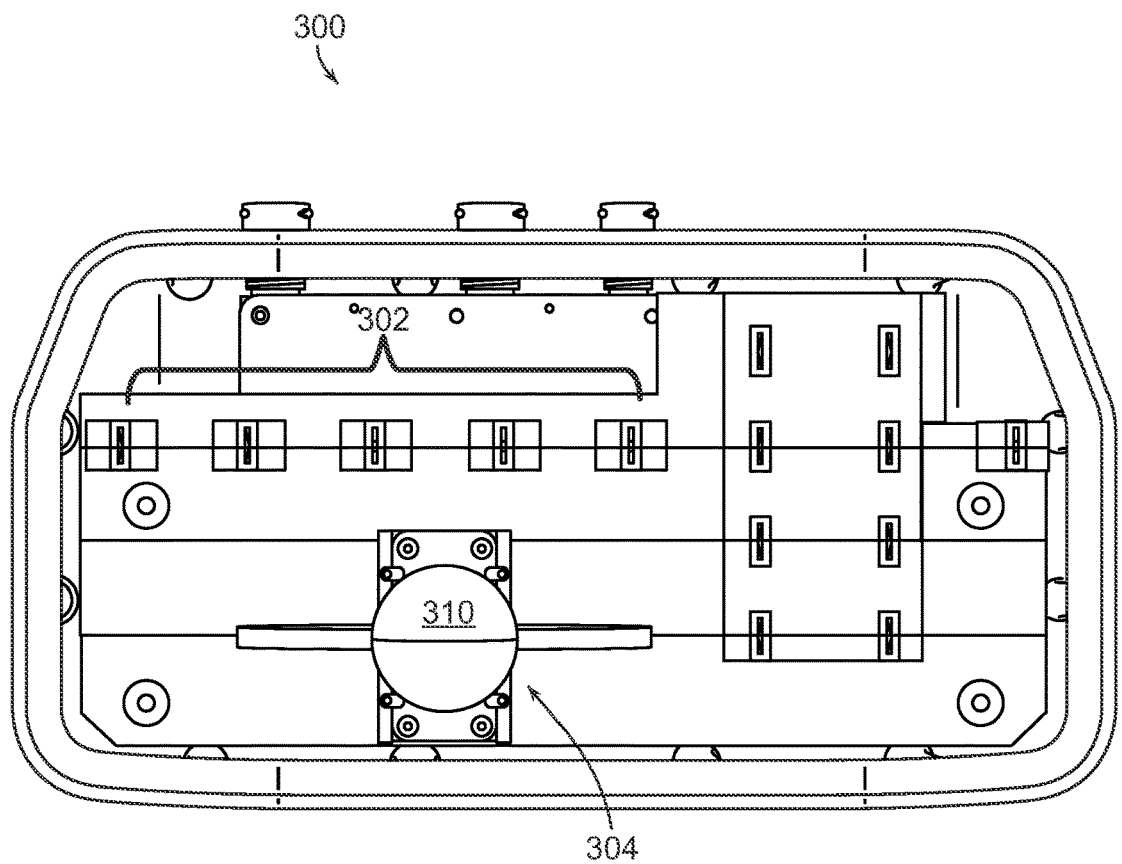
FIG. 3A illustrates an exemplary Luneburg based sensing system.

FIG. 3A illustrates an exemplary Luneburg lens based sensing system 300. The sensing system 300 includes a transmitter 302 that includes an array of antenna elements. The transmitter 302 can generate an outgoing signal that can be reflected by a target object and detected by the receiver 304 (e.g., a feed element array). The outgoing signal can include a plurality of signals generated by the array of antenna elements in the transmitter 302. The receiver 304 includes a Luneburg lens 310 and a second array of feed elements arranged on or adjacent to the surface of the Luneburg lens. The feed elements in the receiver 304 can detect incoming signal (e.g., comprising reflection of a portion of outgoing signal by a target object). The sensing system can include a controller (not shown) configured to receive receiver signals generated by the feed elements in the receiver 304 and/or generate transmitter signals to drive the antenna elements in the transmitter 302. For example, each feed element in the receiver 304 can generate a receiver signal and each antenna element in the transmitter can be driven by a transmitter signal.

Figure 3B:
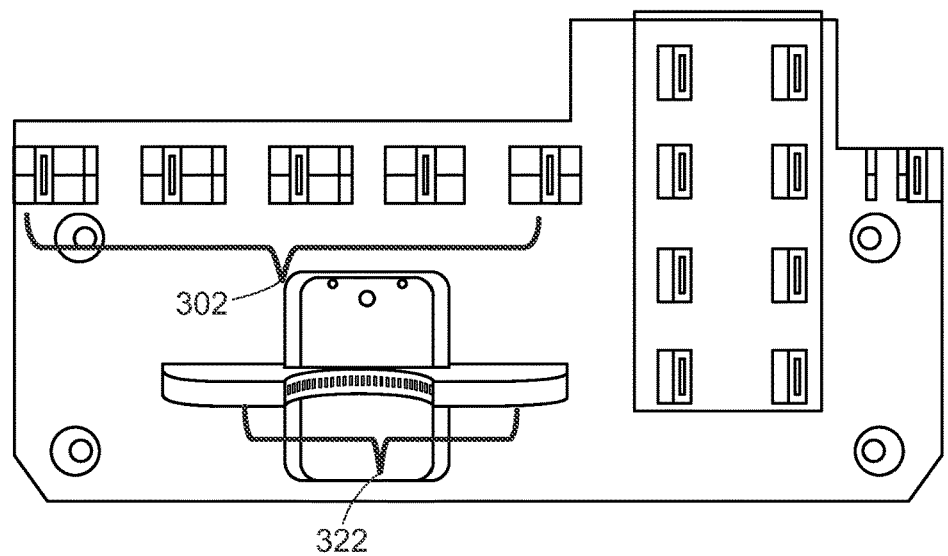
FIG. 3B illustrates an exemplary feed element array of the sensing system in FIG. 3A.

FIG. 3B illustrates exemplary feed element array 322 in the receiver 304 that can receive (or detect) receiver signals (e.g., via a Gradient index lens). The feed element array 322 can generate receiver signals that can be transmitted to a controller. The receiver signals can be transmitted via one or more of transmission lines including planar transmission lines such as co-planar waveguide (CPW), microstrip, optical fibers, waveguides, etc. The feed element array 322 can be geometrically configured to receive a Gradient index lens. For example, the feed element array 322 can be in the shape of a semi-circle that can couple to the circumference of a spherical Gradient index lens. In some implementations, the feed element array 322 can include waveguide openings (e.g., opening of waveguides that transmits receiver signals to the controller). In some implementations, the feed element array 322 can include an array of antenna elements that are mounted on or adjacent to the surface of the Gradient index lens.

Figure 4:
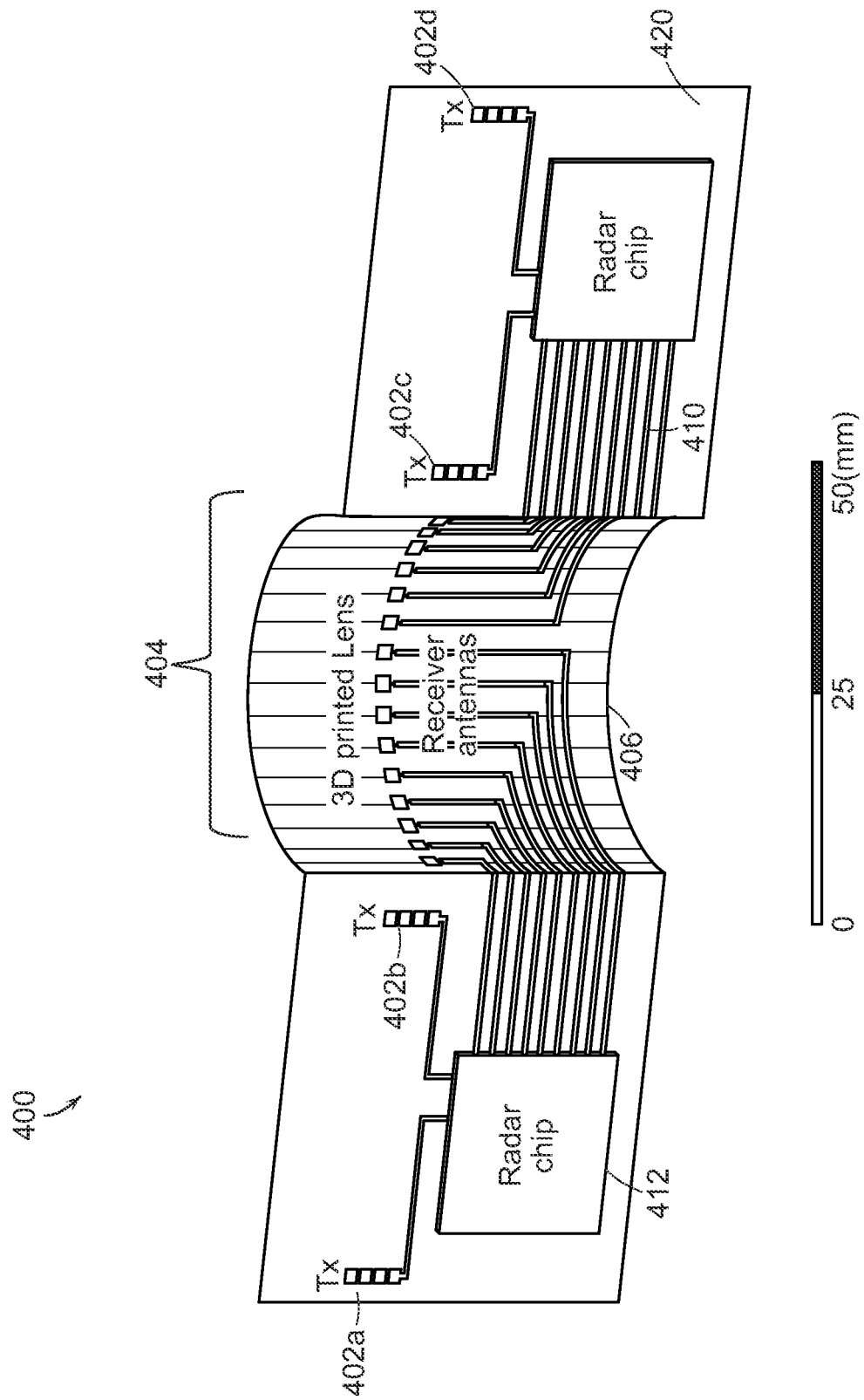
FIG. 4 illustrates an exemplary Gradient index lens based sensing system with feed element array on a flexible board.

FIG. 4 illustrates a gradient index lens based sensing system 400 with feed element array on a flexible printed circuit board. The sensing system 400 includes a transmitter having a plurality of transmitter antenna elements 402a-d. The transmitter antenna elements 402a-d can generate an outgoing signal that can be reflected by a target object. The sensing system 400 also includes a feed element array 404 adjacent to a Gradient index lens 406 (e.g., 3D printed Luneburg lens). For example, the feed element array 404 can surround the Gradient index lens (e.g., at the circumference of the gradient index lens). In some implementations, the feed element array 404 can include a plurality of patches arranged around the gradient index lens.

The transmitter antenna elements 402a-d and the feed element array 404 are communicatively coupled to a radar chip 412 (or multiple radar chips) via feed transmission lines 410. The radar chip 412 can include a controller (e.g., controller 210) that can control the operation of the sensing system 400. For example, the radar chip 412 can include one or more transmitter circuits that can generate one or more transmitter signals to drive the transmitter antenna elements 402a-d. The radar chip 412 can include one or more receiver circuits that can receive one or more receiver signals generated by the feed element array 404. The receiver signals can be transmitted via the feed transmission lines 410. In some implementations, a portion of the outgoing signal generated by the transmitter (e.g., transmitter antenna elements 402a-d) can be transmitted to the feed element array 404. In some implementations, the transmitter element 402a-d, transmission lines 410 and feed element array 404 can be included in a flexible printed circuit board 420.

The distance between the transmitter antenna elements can determine the angular resolution associated with the sensing system 400. For example, greater the distance between the transmitter antenna elements (e.g., a predetermined distance), greater is the angular resolution of the sensing system 400. However, increasing the separation between the transmitter antenna elements can increase the size of the sensing system 400 which may not be desirable. For example, a large sensing system can be unwieldy and unsuitable for coupling with an automobile. A distributed sensing system can provide improved angular resolution.

Figure 5:
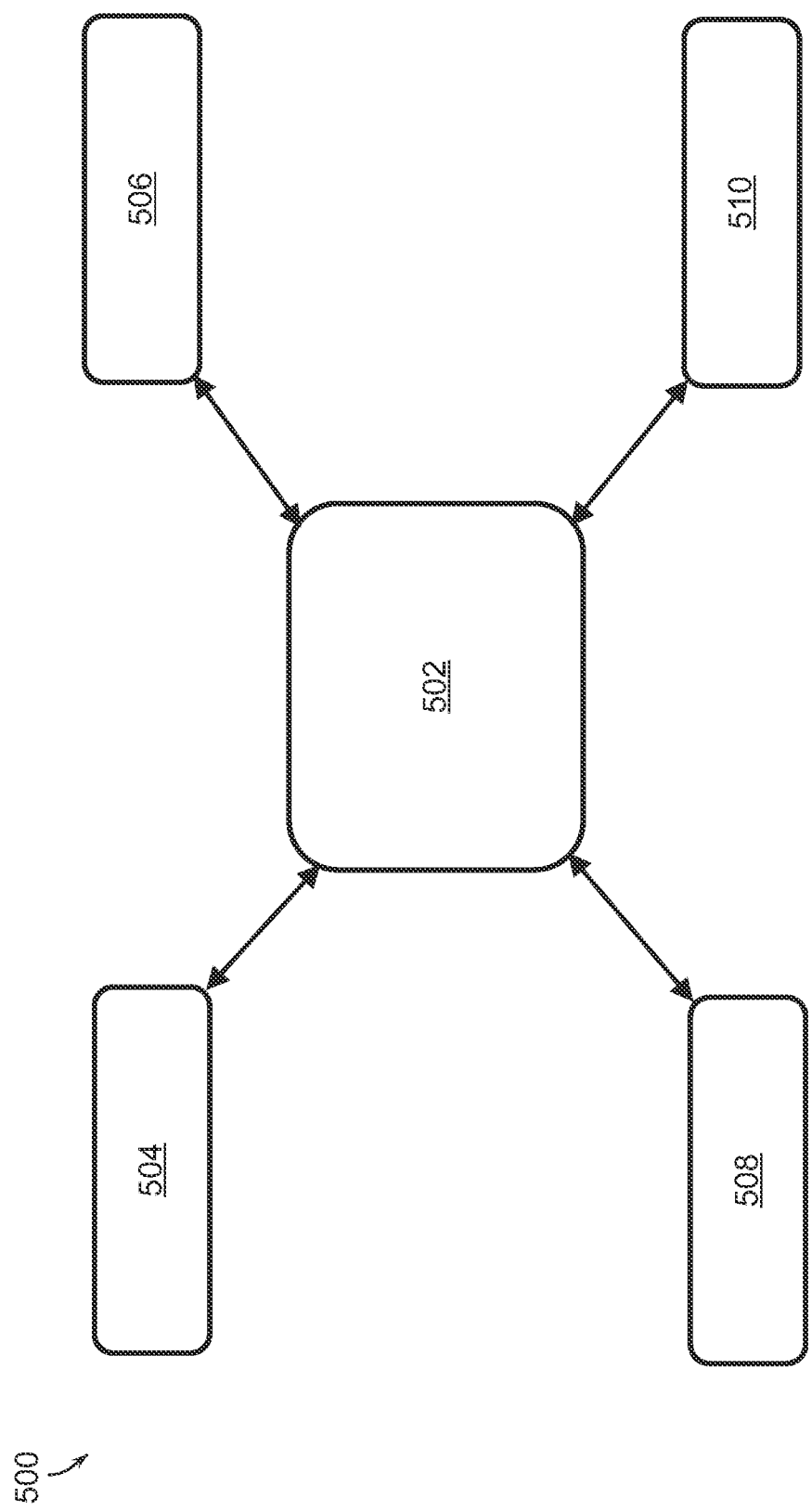
FIG. 5 illustrates an exemplary distributed sensing system.

FIG. 5 illustrates an exemplary distributed sensing system 500 that includes a receiver module 502 and multiple transmitter modules 504-510. The receiver module can include the receiver (e.g., receiver 404, 304, 200, etc.). The receiver module can be communicatively coupled (e.g., via optical fiber, coaxial cable, waveguide, etc.) to transmitter modules 504-510 which can include transmitter antenna (e.g., transmitter antenna elements 402a-d). The transmitter modules 504-510 can be distributed over various locations in an automobile. The number of the transmitter modules and the distance between the transmitter modules can determine the angular resolution of the sensing system 500.

Figure 6:
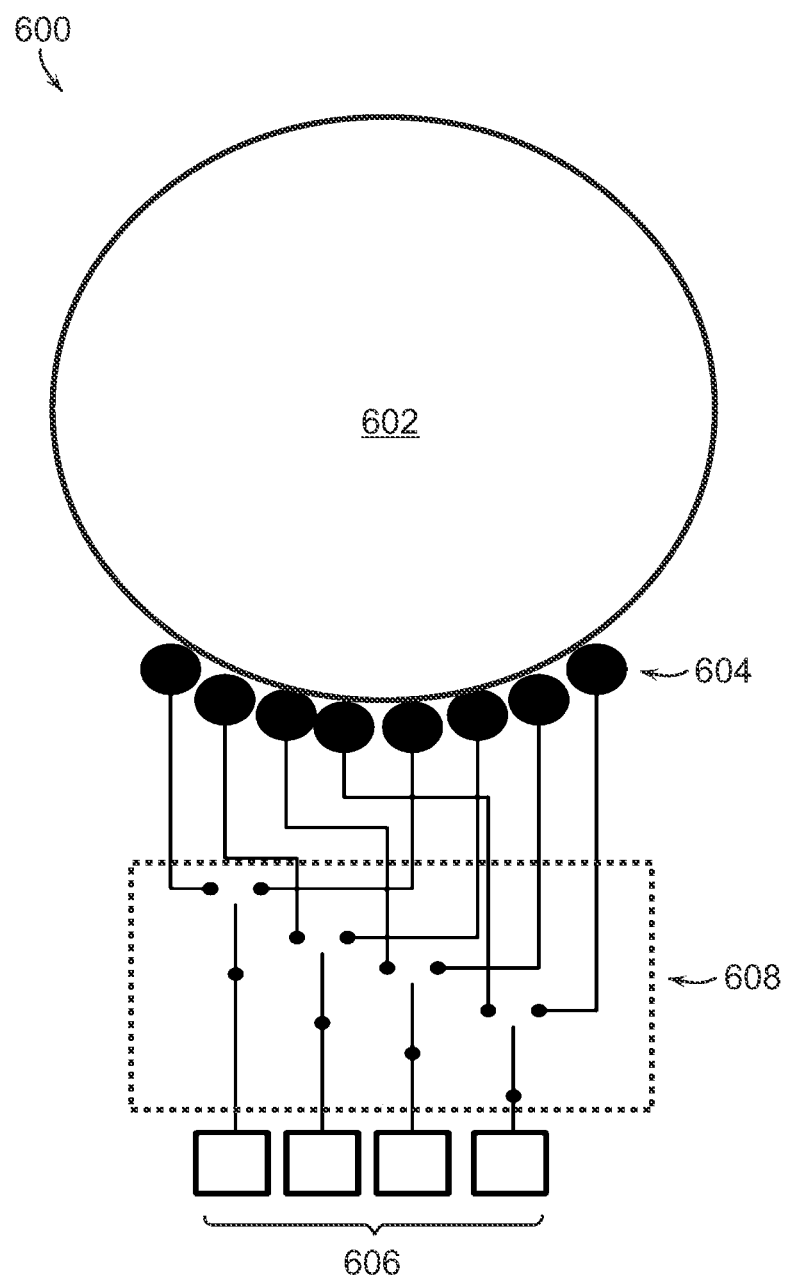
FIG. 6 illustrates an exemplary sensing system including multiple switches.

FIG. 6 illustrates an exemplary receiver 600 including a gradient index lens 602 and feed element array 604 arranged adjacent to the lens 602. The feed element array 604 can generate receiver signals (e.g., based on reception of an incoming signal) that can be transmitted to receiver circuits 606 (e.g., in a radar chip) via switches 608. The switches 608 can allow for a scenario where the number of receiver circuits 606 is different from the number of feed elements in the feed element array 604. For example, the number of receiver circuits 606 can be fewer than the number of feed elements in the feed element array 604. A given receiver circuit can operate with multiple feed elements on a time-sharing basis. For example, a receiver circuit can be electrically connected to a first feed element during a first time duration and to a second feed element during a second time duration. The second time duration can be temporally separated from the first time duration. Similarly, switches can also be used to electrically couple transmitter circuits with transmitter antennas (not shown). For example, the number of transmitter circuits can be fewer than the number of transmitter antennas (e.g., transmitter antenna elements 402a-d). A switch can allow a given transmitter circuit to operate with multiple transmitter antennas on a time-sharing basis as described above. Reduction in the number of receiver/transmitter circuit can reduce the complexity and cost of the radar chip/controller.

Existing sensing systems and the associated detection techniques may not be able to detect target objects in close range (e.g., at a distance below a threshold distance). For example, time taken by undesired reflections from the various components of the sensing system (e.g., packaging, circuitry, etc.) to arrive at the receiver of the sensing system can be similar to the time taken for an outgoing signal to be reflected by the target object. As a result, the sensing system may not be able to distinguish between components of the sensing system and nearby target objects (e.g., target objects within 0.5 meters). However, nearby objects can be detected by comparing an incoming signal (e.g., reflection of an outgoing signal) from a reference object without the nearby target object and with the nearby target object. For example, the presence of a nearby target object may attenuate the amplitude of an incoming signal from a reference object located at a distance above the threshold distance.

In one implementation, a transmitter (e.g., transmitter antenna elements 402a-d) can transmit a first outgoing signal during a first time period. A receiver (e.g., receiver 600, 200, etc.) can receive a first incoming signal from the reference object. The first incoming signal can include a portion of the first outgoing signal reflected by the reference object. Based on the first incoming signal, the sensing system can determine the distance and angular position of the reference object. If the sensing system is moving with respect to the reference object (e.g., a sensing system mounted on an automobile which is moving relative to the reference object), the distance and angular position of the target object may change with time. The transmitter can transmit a second outgoing signal during a second time period in the direction of the reference object and receive a second incoming signal. If the characteristics (e.g., amplitude) of the second incoming signal is different from the first incoming signal, it can be determined (e.g., by a processor) that a target object is located within the threshold distance.

In some implementations, the processor can calculate a differential metric indicative of a difference between amplitudes of the second incoming signal and the first incoming signal. For example, the differential metric can be an absolute value of the difference between the two incoming signals. The differential metric can be compared with a predetermined threshold value. If the differential metric is greater than the predetermined threshold value, presence of a target object within the threshold distance can be determined.

In some implementations, sensing systems described above can be used for effective and accurate detection of target objects moving relative to the sensing system. This can be done using improved multiple-in/multiple-out (MIMO) techniques where one or more transmitters can transmit (e.g., simultaneously) during various time durations. The relative velocity between the sensing system (and the transmitter) and a target object can be different during the various time duration of transmission. The difference in relative velocities can be compensated by applying a velocity based phase compensation. For example, the sensing systems can transmit multiple outgoing signals from multiple transmitter antenna element based on time-division multiple access (TDMA). Subsequently, the sensing system can detect multiple incoming signals which are reflections of the outgoing signals from a moving target. The incoming signal data can be processed to reduce degradation of resolution (e.g., Doppler resolution) and improve detection accuracy. For example, data processing can be modified to account for the Doppler shifts between the incoming and outgoing signals, phase delays in the incoming signals (e.g., which can be a function of the duration of transmission of the corresponding outgoing signals from various transmission antenna elements). The processed data can be used to accurately determine the velocity and location (or angular resolution) of the moving target object.

In some implementations, a first transmitter antenna element (e.g., transmitter antenna elements 402a) can transmit a plurality of outgoing waves. For example, each outgoing wave can be transmitted during a predetermined time duration. After the transmission from the first antenna element, a second antenna element (e.g., transmitter antenna elements 402b) can transmit a second plurality of outgoing waves. Similarly other transmission antenna elements (e.g., transmitter antenna elements 402c, 402d, etc.) can transmit outgoing beams at subsequent times.

A receiver (e.g., receiver 600, 200, etc.) can detect the reflections of the outgoing signals from the target object (e.g., a moving automobile). For example, the receiver can receive first and second plurality of incoming signals corresponding to first and second outgoing signals, respectively. Because the various outgoing signals are transmitted during different time durations, the incoming signal can arrive at the receiver at different time durations. For any given incoming signal, the receiver can make multiple detections (e.g., periodically). This is referred to as "sampling".

The receiver can provide the data characterizing the detection of the incoming signals to a controller (e.g., controller 210, radar chip 412, etc.) via a communication channel (e.g., feed element array 410, transmission lines, etc.). In one implementation, the received data can include multiple samples (or detections) associated with the various (e.g., each) of the incoming signal (e.g., the first incoming signal, the second incoming signal, etc.). In another implementation, the controller can sample an incoming signal data based on the various detection times associated with the incoming signal data.

The controller can generate a data matrix for incoming signals associated with the various (e.g., each) transmitter antenna element (e.g., reflections of outgoing signals transmitted by an antenna element). The columns of the data matrix can represent the various samples (or the time of sampling) associated with a given incoming signal. The rows of the data matrix can represent the duration of generation of the outgoing signals for the given transmission antenna element. Similarly, the controller can generate data matrix for the various transmitter antenna elements (transmitter antenna elements 402a-d) in the sensing system.

In one implementation, the controller can perform a range Fourier transform (fast Fourier transform [FFT]) on the rows of the data matrix which is representative of sampling values of incoming signals. For example, range Fourier transform can be applied to sampling values of data of each incoming signal in the first and the second plurality of incoming signals. The application of the range Fourier transform on the data matrix can result in a second data matrix where the columns are indicative of various range values associated with the target object and the columns are indicative of duration of generation of the outgoing signals (e.g., as in the first data matrix).

The controller can perform a velocity (or Doppler) Fourier transform on each column of the second data matrix which is a function of time duration of outgoing signal generation for a given range value. The application of the velocity Fourier transform on the second data matrix can result in a third data matrix where the columns are indicative of various range values associated with the target object and the rows are indicative of a plurality of velocity values associated with the target object. Each column of the third data matrix represents a given range value and is a function of the plurality of velocity values.

In some implementations, the data in the columns of the third data matrix can be interpolated. Interpolation can be performed by various interpolation methods (e.g., sinc function interpolation, polynomial interpolation, padding zeros before Fourier transform, etc.). After interpolation, the controller can compensate for the phase delay associated with the various transmitter antenna element. For example, a first phase compensation can be applied to data associated with the first transmitter antenna element, and a second phase compensation can be applied to interpolated data associated with the second transmitter antenna element. The phase compensation (or "doppler phase) can be a function of velocity values and the time of transmission of the outgoing signals from the various transmitter antenna elements (e.g., relative velocity between first/second transmitter antennal element and the target object during the transmission the first/second outgoing signal). The phase compensated data can be used to calculate the location, velocity, angular resolution of the target object.

In some implementations, higher Doppler resolution can be achieved by stitching data of incoming signals associated with various transmitter antenna elements, and by subsequent application of Doppler Fourier transform. For example, a first phase compensation can be applied to portions of the second data matrix associated with a first transmitter antenna element and a second phase compensation can be applied to portions of the second data matrix associated with a second transmitter antenna element. The first and the second phase compensation can be the doppler phases associated with the first and second transmitter as described above. The phase compensated portions can be arranged together (or stitched). For example, the columns of the stitched data matrix can be a function of various range values associated with the target object and the rows of the stitched matrix can be a function of the duration of generation of the outgoing signals of multiple transmitter antenna elements.

The controller can perform a velocity (or Doppler) Fourier transform on each column of the stitched data matrix which is associated with a given range value. The application of the velocity Fourier transform on the stitched data matrix can result in a modified data matrix where the columns are indicative of various range values associated with the target object and the rows are indicative of a plurality of velocity values associated with the target object.

By applying FFT to the signal after application of Doppler phases, higher Doppler accuracy can be achieved. In this case, the accuracy of Doppler may not be limited by the number of Doppler bins and can be related to the signal to noise ratio of the radar system. With the more accurate Doppler information, accurate Doppler phase delay between different transmitters can be calculated by:

$$\emptyset_{delay}=4\pi*v*\text{time}_{Tx}/\lambda$$

By compensating the phase difference between different Tx (e.g., based on time of transmission (time$_{Tx}$) and relative velocity (v) between transmitter t$_x$ and target object) and by applying MIMO angle finding algorithm, accurate angle results can be obtained.

The various embodiments, described in the application can provide various advantages. For example, FIG. 2 describes cost-effective sensing system that can allow for detection of objects proximal to the automobile. FIGS. 3A, 3B and 4 describe modular sensing systems that are compact (e.g., do not occupy a large space) and can allow for efficient detection of objects. The distributed sensing system in FIG. 5 can improve the angular resolution of object detection while keeping the overall radar system compact. This can make the autonomous vehicle on which the distributed sensing system is mounted more responsive of external objects and as result safer. The improved MIMO techniques describe above can allow for accurate detection of target objects from a fast moving vehicle.

The range of velocities that a sensing system can detect can be based on the frequency with which the sensing system can emit outgoing signals. In other words, the velocity range of the sensing system can depend on the time interval at which outgoing signals are repeated (Pulse repeat interval [PRI]). The maximum velocity that a sensing system can measure ("maximal unambiguous velocity") is be represented by:

$$v_{max} = \pm \frac{\lambda f_{Dmax}}{2} = \pm \frac{\lambda}{4PRI}$$

where λ is the wavelength of the outgoing signal and $$f_{Dmax} = \pm \frac{1}{2PRI}$$

Figure 7:
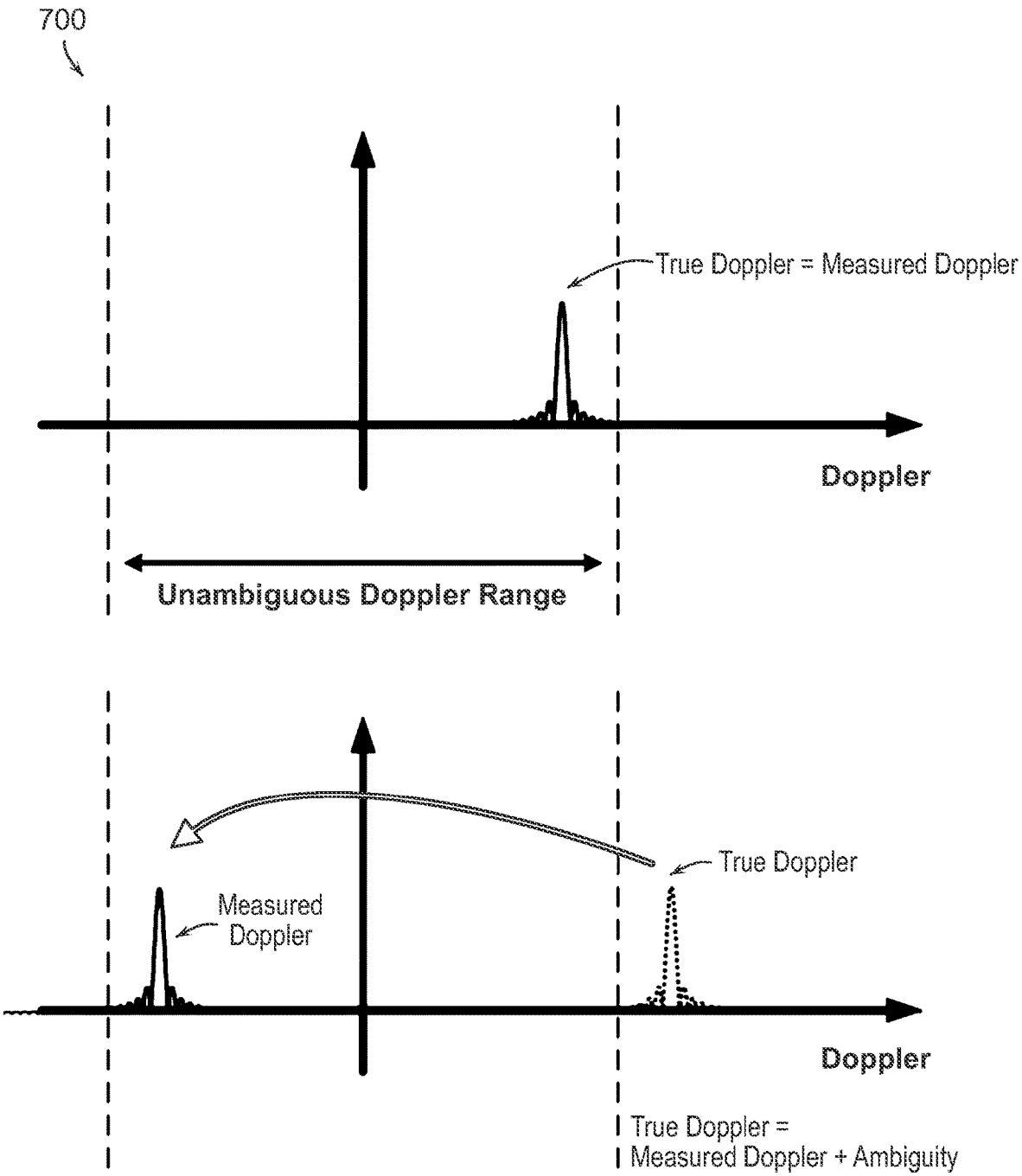
FIG. 7 illustrates an exemplary mapping between a real velocity and a target velocity of a target object for a given unambiguous Doppler range.

In other words, the range of velocities that the sensing system can detect ranges from −λ/4PRI to λ/4PRI. If the target object is traveling at a velocity outside the range of velocities, there can be a discrepancy or ambiguity between the measured velocity and the real velocity of the target object. As illustrated in FIG. 7, if the real velocity (or true Doppler) of the target object is within the velocity range (or unambiguous Doppler range) of the sensing system, the real velocity can be the same as measured velocity (or measured Doppler). If the real velocity of the target object is outside the velocity range of the sensing system, the real velocity may not correspond to the measured velocity.

Ambiguity between the measured and real velocities of the target object can be corrected by using outgoing signals having multiple modes (or outgoing signals with different pulse repeat interval settings). However, using outgoing signals having multiple modes may be undesirable. For example, a sensing system operating with multiple modes can be complex and can be less flexible (e.g., for outgoing signal waveform settings). Additionally or alternately, for accurate detection using multiple modes, the target object may need to remain relatively stable for a long period of time which may not be practical.

In one implementation, the ambiguity between the measured and the real velocity can be corrected by using outgoing signals having a single mode (e.g., outgoing signals having a single pulse repeat interval setting). This can be done, for example, by generating multiple outgoing signals from multiple transmitter antenna elements based on time-division multiple access (TDMA), and subsequently detecting multiple incoming signals which are reflections of the outgoing signals from a moving target (e.g., as described above). The controller can generate a data matrix where the columns of the data matrix can represent the various sampling times and the rows represent the duration of generation of the outgoing signal. Range and Doppler (or velocity) transformation can be performed on the data matrix. This can result in the generation of the third data matrix where the columns are indicative of various range values associated with the target object (e.g., each column is indicative of a given range value) and the rows are indicative of a plurality of velocity values associated with the target object (e.g., each row is associated with a given velocity value).

The velocity values associated with the rows are indicative of the measured velocity (or Doppler) values. The real velocity for each of the rows can be related to the measured velocity by the following expression:

$$v_{real}=v_{measured}+n \cdot V_{Period}$$

where n is an ambiguity integer and $$V_{Period} = \frac{\lambda}{2PRI}.$$

Figure 8:
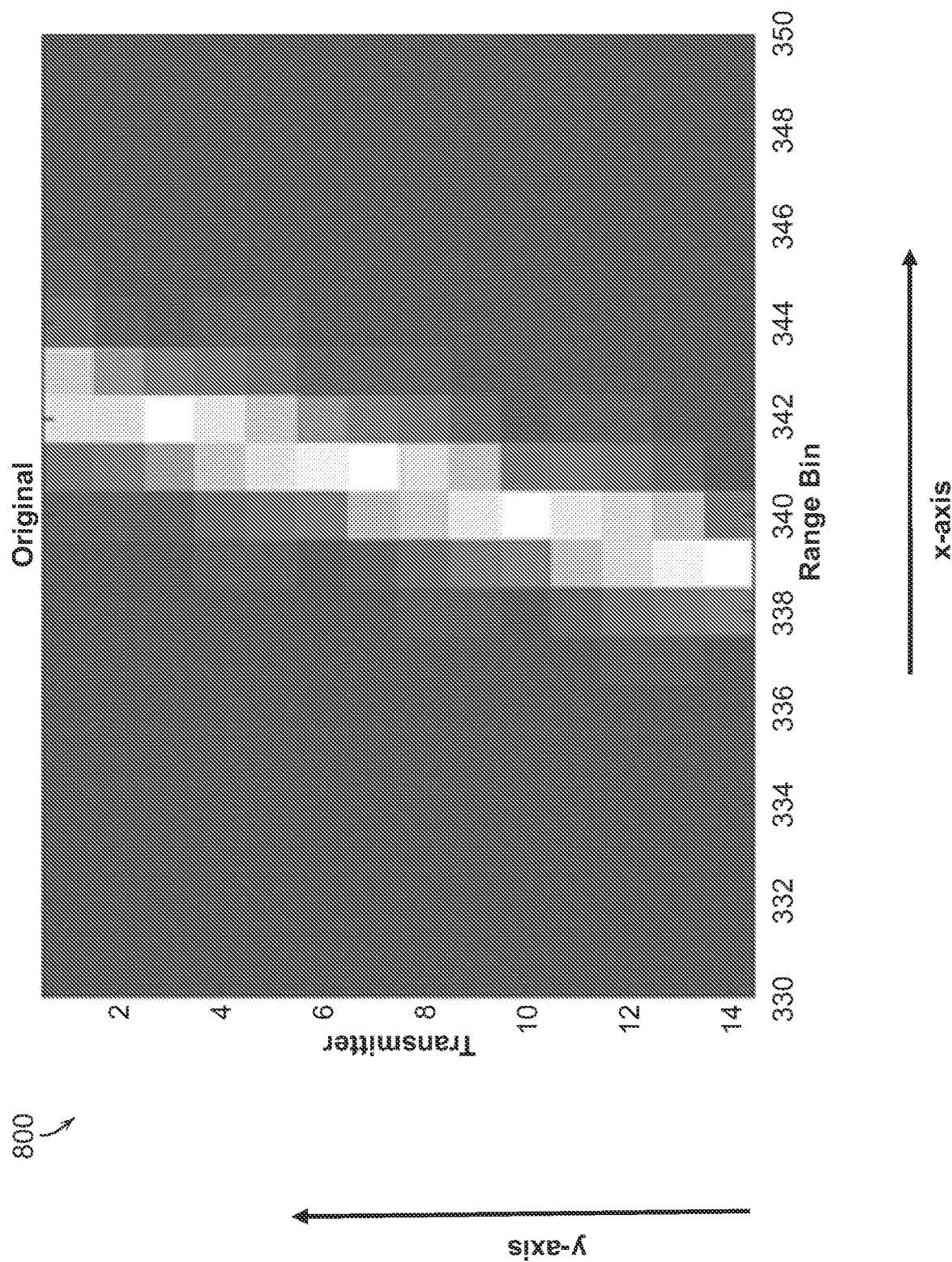
FIG. 8 illustrates an exemplary two-dimensional plot of range and velocity transformed incoming signals from multiple transmitter antenna elements.

Additionally, for rows of the third data matrix associated with a given transmitter antenna element (e.g., rows of the third data matrix that have been calculated by range and velocity transforms of incoming signal resulting from reflection of outgoing signal of the given transmitter antenna element), Range Cell Migration (RCM) can be calculated. RCM can be indicative of migration of target object during detections by the different transmitter antenna elements. FIG. 8 illustrates an exemplary two-dimensional plot of the third data matrix where the x-axis represents the range values and the y-axis represents the transmitter antenna elements. As illustrated in FIG. 8, different transmitter antenna elements have different range values. This can indicate that the target object has moved relative to the sensing system between detections by the different transmitter antenna elements. For an $i_{tx}$ transmitter antenna element $T_x$ (e.g., indicative of temporal order in which the transmitter antenna element is activated to generate the outgoing signal), RCM can be represented by:

$$RCM_{i\_tx} = i\_tx \cdot v_{real} \cdot t_{Tx} = i\_tx(v_{measured} + n \cdot V_{Period})t_{Tx}$$

where $i_{tx}=0, 1, 2, \ldots N_{Tx}$ and $t_{Tx}$ is the known time difference between generation of outgoing signals two consecutive antenna elements $T_x$. Real velocity of the target object can be obtained from RCM values associated with the various antennas, i_tx, and $t_{Tx}$. If a given real velocity of a target object is outside the velocity range of the sensing system, the corresponding ambiguity integer n can be determined. The ambiguity integer n can set the desired velocity range of the sensing system (which can include the real velocity of the target object). For example, velocity range of a detection system for a given ambiguity integer n can range from $-n*V_{period} - V_{Period}/2$ to $n*V_{Period} + V_{Period}/2$).

Figure 9:
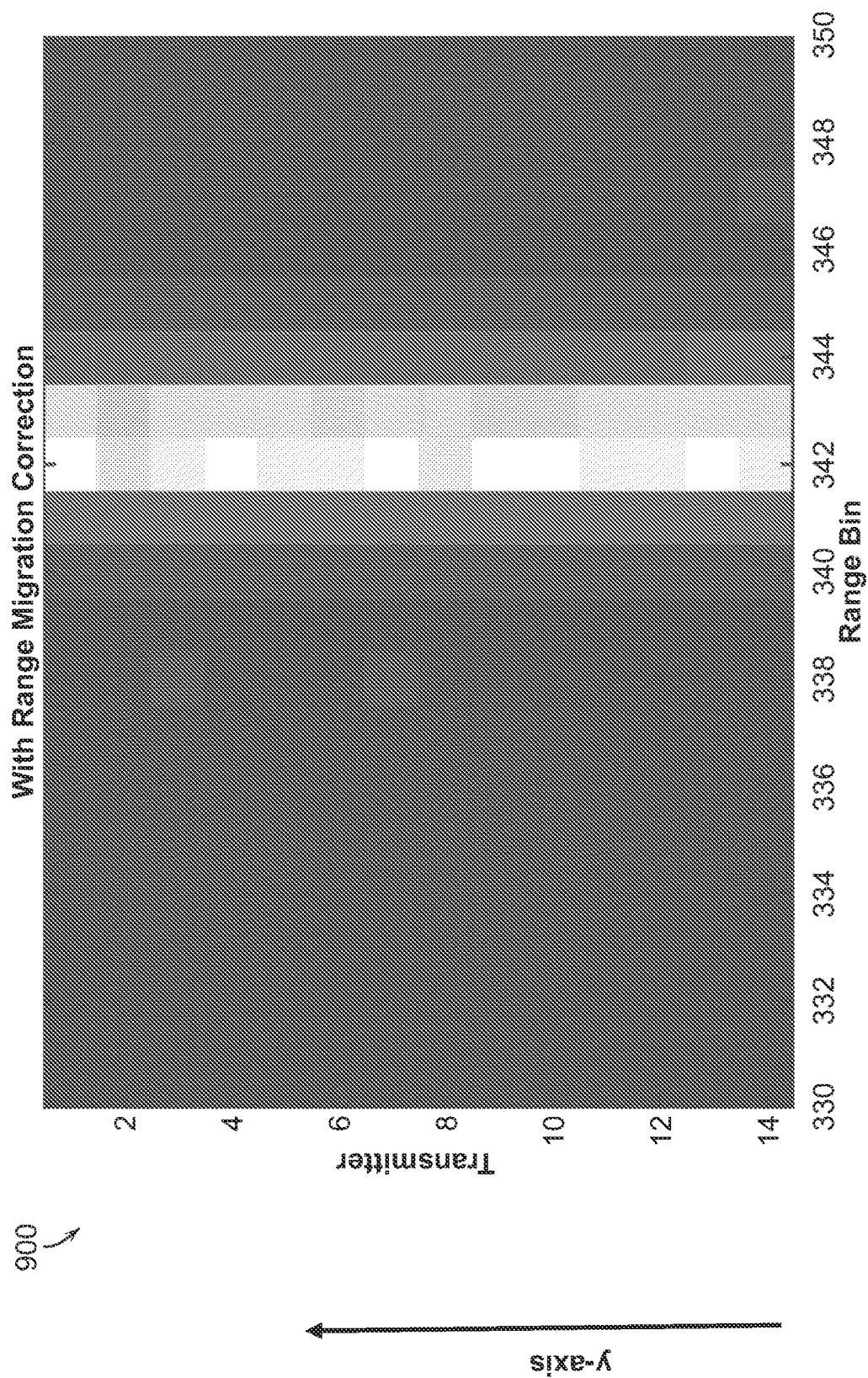
FIG. 9 illustrates an exemplary RCM corrected plot generated by correcting RCM of FIG. 8.

RCM associated with the various transmitter antenna element can be corrected for by interpolation in range for each transmitter. The correction can be performed for various values of ambiguity factor ambiguity integer n. In some implementations, the ambiguity integer n can be selected such that the signal from various transmitter antenna elements are aligned. FIG. 9 illustrates an exemplary plot of RCM corrected plot generated by correcting RCM of FIG. 8. In FIG. 9, by setting the value of n=−1, the signal from the different transmitter antenna elements can be aligned. Once the ambiguity integer n is determined, the real velocity can be calculated from the measured velocity using the expression $$v_{real} = v_{measured} + n \cdot V_{Period}$$

In some implementations, a range value of the target object can be determined for each transmitter antenna element. As illustrated in FIG. 8, the range values calculated for the target object may be different which can indicate that the target object moved relative to the sensing system between detections by the different transmitter antenna elements. From the range values, RCM can be calculated for each transmitter antenna element such that modified range values of each transmitter antenna element (e.g., obtained by adding/subtracting RCM of a given transmitter antenna element to the range value of the antenna element) have same or similar values. For a given transmitter antenna element, the ambiguity integer n can be calculated based on the corresponding RCM value ($RCM_{i\_tx}$), $i_{tx}$ and $t_{Tx}$ (as described above).

In some implementations of sensing systems (e.g., for automotive self-driving cars), it can be desirable to discriminate between a static live object such as a person or animal from other static non-living objects (e.g., shopping cart). Such discrimination can be performed, by measuring multiple consecutive incoming signals (or frames) from the target object and calculating the standard deviation of the amplitude of the incoming signal (e.g., detected point cloud). The discrimination can be based on existence of small motions associated with live objects (e.g., breathing movement, facial movement, etc.). Such movements can be identified from multiple frames of incoming signals (e.g., by calculating standard deviation of multiple incoming signal).

In one implementation, multiple incoming signals from a target object can be detected by a receiving antenna element. A standard deviation can be calculated for the incoming signals (e.g., standard deviation of amplitude/intensity of incoming signals). If the standard deviation value is above a threshold value, the target object can be designated as a living object. If the standard deviation is below the threshold, it can be designated at a non-living object.

Figure 10A:
FIGS. 10A-C illustrated exemplary discrimination between a live object and a non-living object.
Figure 10C:
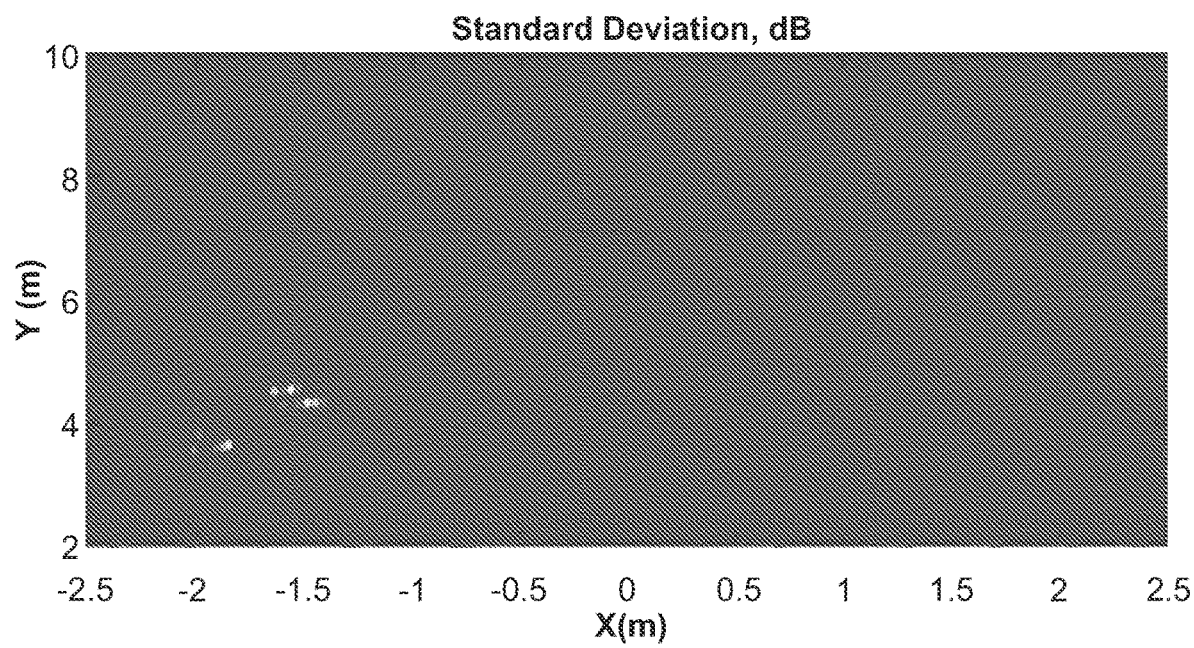
Figure 10B:
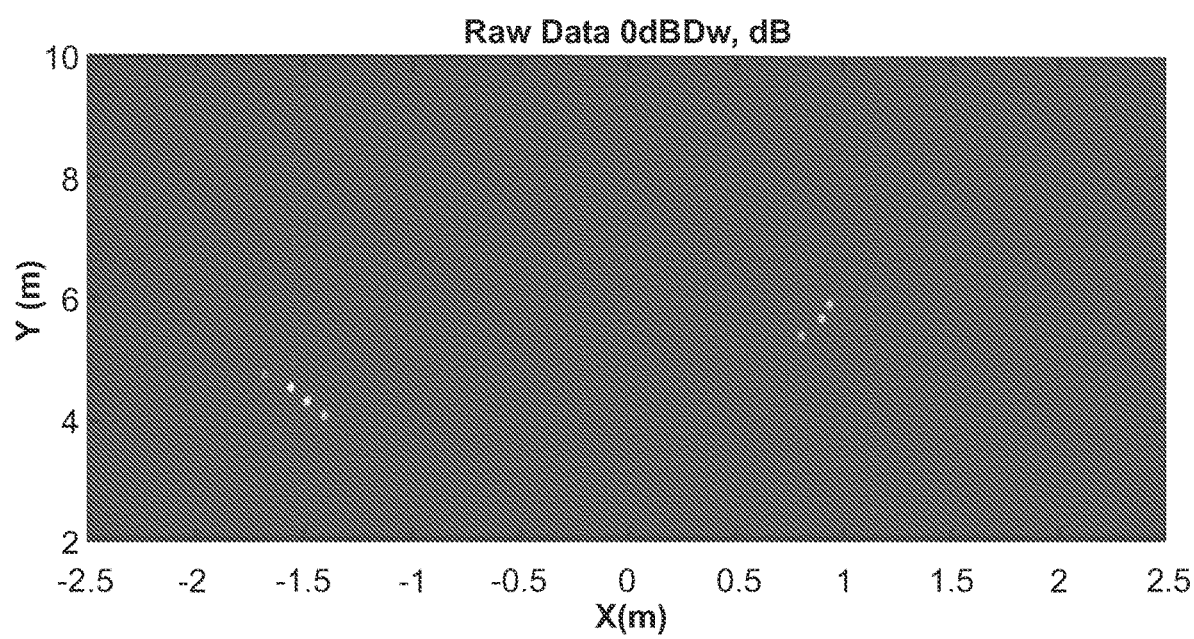

FIGS. 10A-C describes exemplary discrimination between a live object (person) and a non-living object (shopping card). FIG. 10A illustrates images of a person and a shopping card. FIG. 10B illustrates raw data associated with incoming signals reflected by the person and the shopping cart. As shown in FIG. 10B, incoming signal from both the person and the shopping cart is detected (e.g., illustrated by signal at x=−1.5 and x=1, respectively). FIG. 10C illustrates standard deviation of the raw data in FIG. 10B. FIG. 10C illustrates that only the standard deviation associated with the incoming signal from the person is perceptible. As a result, from FIG. 10C, a live object (person) can be discriminated from a shopping cart.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:
1. A sensing system, comprising:
 a receiver comprising:
  a Gradient-index lens, and
  a first plurality of antenna elements arranged adjacent to the Gradient-index lens and configured to receive a first incoming signal and generate a plurality of receiver signals in response to receiving the first incoming signal;
 a transmitter including a second plurality of antenna elements configured to generate an outgoing signal, wherein each of the second plurality of antenna elements are separated by a predetermined distance;
 a controller configured to receive the plurality of receiver signals from the first plurality of antenna elements, and generate a plurality of transmitter signals based on which the transmitter generates the outgoing signal; and a plurality of waveguides configured to transmit the plurality of receiver signals from the first plurality of antenna elements to the controller, wherein the first plurality of antenna elements include plurality of openings of the first plurality of waveguides.

2. The sensing system of claim 1, further comprising a plurality of transmission lines configured to transmit the plurality of receiver signals from the first plurality of antenna elements to the controller and/or transmit the plurality of transmitter signals from the controller to the transmitter.

3. The sensing system of claim 2, wherein the controller is included in a radar chip, wherein the controller includes at least one receiver circuit and at least one transmitter circuit.

4. The sensing system of claim 3, further comprising:
a first switch configured to electrically connect the at least one receiver circuit to a first antenna element of the first plurality of antenna elements during a first time period, and to a second antenna element of the first plurality of antenna elements during a second time period,
wherein the first time period is temporally separated from the second time period.

5. The sensing system of claim 3, further comprising:
a second switch configured to electrically connect the at least one transmitter circuit to a third antenna element of the second plurality of antenna elements during a third time period, and to a fourth antenna element of the second plurality of antenna elements during a fourth time period,
wherein the third time period is temporally separated from the fourth time period.

6. The sensing system of claim 3, wherein the radar chip, the first plurality of antenna elements, the second plurality of antenna elements, and the transmission lines are included in a flexible printed circuit board.

7. The sensing system of claim 6, wherein a first portion of the flexible printed circuit board comprising the first plurality of antenna elements surrounds a second portion of the gradient-index lens.

8. The sensing system of claim 1, wherein the receiver is located within a vehicle and the second plurality of antenna elements are located at varied locations within the vehicle separate from the receiver.

9. The sensing system of claim 8, wherein a distance between the locations of the second plurality of antenna elements is proportional to an angular resolution associated with the sensing system.

10. The sensing system of claim 9, wherein a portion of the outgoing signal is transmitted to the receiver via one or more of a transmission line.

11. The sensing system of claim 1, wherein the first incoming signal includes a portion of the outgoing signal reflected by a target object.

12. A sensing system, comprising:
a receiver comprising:
a Gradient-index lens, and
a first plurality of antenna elements arranged adjacent to the Gradient-index lens and configured to receive a first incoming signal and generate a plurality of receiver signals in response to receiving the first incoming signal;
a transmitter including a second plurality of antenna elements configured to generate an outgoing signal, wherein each of the second plurality of antenna elements are separated by a predetermined distance; and
a controller configured to receive the plurality of receiver signals from the first plurality of antenna elements, and generate a plurality of transmitter signals based on which the transmitter generates the outgoing signal,
wherein the receiver is located within a vehicle and the second plurality of antenna elements are located at varied locations within the vehicle separate from the receiver, and a distance between the locations of the second plurality of antenna elements is proportional to an angular resolution associated with the sensing system.

13. The sensing system of claim 12, wherein the controller is included in a radar chip, wherein the controller includes at least one receiver circuit and at least one transmitter circuit.

14. The sensing system of claim 13, further comprising:
a first switch configured to electrically connect the at least one receiver circuit to a first antenna element of the first plurality of antenna elements during a first time period, and to a second antenna element of the first plurality of antenna elements during a second time period,
wherein the first time period is temporally separated from the second time period.

15. The sensing system of claim 13, further comprising:
a second switch configured to electrically connect the at least one transmitter circuit to a third antenna element of the second plurality of antenna elements during a third time period, and to a fourth antenna element of the second plurality of antenna elements during a fourth time period,
wherein the third time period is temporally separated from the fourth time period.

16. The sensing system of claim 13, wherein the radar chip, the first plurality of antenna elements, the second plurality of antenna elements, and the transmission lines are included in a flexible printed circuit board.

17. The sensing system of claim 16, wherein a first portion of the flexible printed circuit board comprising the first plurality of antenna elements surrounds a second portion of the gradient-index lens.

18. A sensing system, comprising:
a receiver comprising:
a Gradient-index lens, and
a first plurality of antenna elements arranged adjacent to the Gradient-index lens and configured to receive a first incoming signal and generate a plurality of receiver signals in response to receiving the first incoming signal;
a transmitter including a second plurality of antenna elements configured to generate an outgoing signal, wherein each of the second plurality of antenna elements are separated by a predetermined distance;
a controller configured to receive the plurality of receiver signals from the first plurality of antenna elements, and generate a plurality of transmitter signals based on which the transmitter generates the outgoing signal, wherein the controller is included in a radar chip, wherein the controller includes at least one receiver circuit and at least one transmitter circuit; and
a first switch configured to electrically connect the at least one receiver circuit to a first antenna element of the first plurality of antenna elements during a first time period, and to a second antenna element of the first plurality of antenna elements during a second time period,
wherein the first time period is temporally separated from the second time period.

19. The sensing system of claim 18, further comprising a plurality of transmission lines configured to transmit the plurality of receiver signals from the first plurality of antenna elements to the controller and/or transmit the plurality of transmitter signals from the controller to the transmitter.

20. The sensing system of claim 18, wherein the first incoming signal includes a portion of the outgoing signal reflected by a target object.

* * * * *